US012591693B2

(12) United States Patent
Guo et al.

(10) Patent No.: US 12,591,693 B2
(45) Date of Patent: Mar. 31, 2026

(54) SECURITY ARCHITECTURE SYSTEM, CRYPTOGRAPHIC OPERATION METHOD FOR SECURITY ARCHITECTURE SYSTEM, AND COMPUTING DEVICE

(71) Applicant: Phytium Technology Co., Ltd., Tianjin (CN)

(72) Inventors: Yufeng Guo, Tianjin (CN); Zhuo Ma, Tianjin (CN); Yanzhao Feng, Tianjin (CN); Ming Zhang, Tianjin (CN); Qingshan Zhu, Tianjin (CN); Qiaoqiao Hu, Tianjin (CN)

(73) Assignee: Phytium Technology Co., Ltd., Tianjin (CN)

( * ) Notice: Subject to any disclaimer, the term of this patent is extended or adjusted under 35 U.S.C. 154(b) by 190 days.

(21) Appl. No.: 17/992,223

(22) Filed: Nov. 22, 2022

(65) Prior Publication Data

US 2023/0161885 A1    May 25, 2023

(30) Foreign Application Priority Data

Nov. 24, 2021    (CN) .......................... 202111398355.7

(51) Int. Cl.
*G06F 21/60*        (2013.01)
*G06F 21/72*        (2013.01)

(52) U.S. Cl.
CPC ............ *G06F 21/602* (2013.01); *G06F 21/72* (2013.01)

(58) Field of Classification Search
CPC ................................ G06F 21/602; G06F 21/72
See application file for complete search history.

(56) References Cited

U.S. PATENT DOCUMENTS

| | | | |
|---|---|---|---|
| 2015/0007128 A1* | 1/2015 | Yu .............................. | G06F 8/24 |
| | | | 717/104 |
| 2015/0113266 A1* | 4/2015 | Wooten .................. | H04L 9/3234 |
| | | | 713/155 |
| 2018/0075259 A1* | 3/2018 | Manapragada ......... | G06F 21/85 |
| 2018/0241571 A1* | 8/2018 | Lu ...................... | G06Q 20/3227 |
| 2020/0267127 A1* | 8/2020 | Mitra ...................... | H04L 9/088 |
| 2020/0366653 A1* | 11/2020 | Caceres .............. | H04L 63/0853 |
| 2021/0143984 A1* | 5/2021 | Han ........................ | H04L 9/083 |
| 2021/0312091 A1 | 10/2021 | Dafali et al. | |
| 2022/0229908 A1* | 7/2022 | Peisert .................... | G06F 21/53 |

FOREIGN PATENT DOCUMENTS

| | | |
|---|---|---|
| CN | 101411121 A | 4/2009 |
| CN | 101820342 A | 9/2010 |
| CN | 102696038 A | 9/2012 |
| CN | 104081712 A | 10/2014 |
| CN | 106415564 A | 2/2017 |
| CN | 106980794 A | 7/2017 |

(Continued)

*Primary Examiner* — Viet D Vu

(74) *Attorney, Agent, or Firm* — ANOVA LAW GROUP, PLLC

(57)        ABSTRACT

A security architecture system includes one or more subsystems, a hardware cryptographic engine, and a controller. At least one of the one or more subsystems has access authority to the hardware cryptographic engine; and the controller is configured to instruct a subsystem having access authority to access the hardware cryptographic engine via an access interface to control the hardware cryptographic engine to perform a cryptographic operation.

11 Claims, 6 Drawing Sheets

(56)             References Cited

FOREIGN PATENT DOCUMENTS

| | | | |
|---|---|---|---|
| CN | 107408096 | A | 11/2017 |
| CN | 107851162 | A | 3/2018 |
| CN | 110543764 | A | 12/2019 |
| CN | 111429254 | A | 7/2020 |
| CN | 111767586 | A | 10/2020 |
| CN | 112136131 | A | 12/2020 |
| CN | 113420308 | A | 9/2021 |
| CN | 113678129 | A | 11/2021 |

* cited by examiner

Security Architecture System
100

One or More Subsystems          101

Hardware Cryptographic Engine          102

Controller          103

Security Architecture System
200

REE                    TEE                    SE

| Application Program 1 ... Application Program n | Trusted Service Request → Response ← | Trusted Application 1 ... Trusted Application p | Security Service Reqeust → Response ← | Security Application 1 ... Security Application m |

SECURITY ARCHITECTURE SYSTEM, CRYPTOGRAPHIC OPERATION METHOD FOR SECURITY ARCHITECTURE SYSTEM, AND COMPUTING DEVICE

CROSS-REFERENCE TO RELATED APPLICATION

This application claims priority to Chinese Application No. 202111398355.7, filed on Nov. 24, 2021, the entire content of which is incorporated herein by reference.

TECHNICAL FIELD

The present disclosure is related to the technical field of processors and, more specifically, to a security architecture system, a cryptographic operation method for the security architecture system, and a computing device.

BACKGROUND

With the increasing demand for security, cryptography is gradually applied to various computing devices. Cryptography is the foundation for protecting information security and has become an indispensable and important part of information systems. In related processors, common operation instructions are generally used to implement cryptographic operations in software. However, the cryptographic operation performance implemented with this method is low and cannot meet the needs of many application scenarios. In addition, cryptographic operations implemented in software have high security risks such as physical attacks and malicious access.

SUMMARY

In accordance with the disclosure, embodiments of this application provide a security architecture system. The security architecture system includes one or more subsystems; a hardware cryptographic engine, at least one of the one or more subsystems having access authority to the hardware cryptographic engine; and a controller configured to instruct a subsystem having the access authority to the hardware cryptographic engine via an access interface to control the hardware cryptographic engine to perform a cryptographic operation.

Further in accordance with the disclosure, embodiments of this application provide a cryptographic operation method for a security architecture system. The security architecture system includes one or more subsystems, and at least one of the one or more subsystems have access authority to a hardware cryptographic engine. The method includes instructing, by a controller, the subsystem with the access authority to access the hardware cryptographic engine via an access interface to control the hardware cryptographic engine to perform a cryptographic operation.

Further in accordance with the disclosure, embodiments of this application provide computer device with a security architecture system. The security architecture system includes one or more subsystems; a hardware cryptographic engine, at least one of the one or more subsystems having access to the hardware cryptographic engine; and a controller configured to instruct a subsystem having access authority to access the hardware cryptographic engine via an access interface to control the hardware cryptographic engine to perform a cryptographic operation.

BRIEF DESCRIPTION OF THE DRAWINGS

To clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, the singular forms "a," "an," and "the" may be intended to include the plural forms as well, unless the context clearly indicates otherwise. Terms such as "first" and "second" used in the present disclosure do not indicate any sequence, quantity or importance, but they are just used to distinguish different components. Also, terms such as "include" and "comprise" mean that an element or an object appearing prior to the word covers an element or an object or its equivalent listed subsequent to the word, but does not exclude other elements or objects. Terms such as "connect" and "connected to" are not limited to physical or mechanical connection, but can comprise electrical connection, regardless of direct connection or indirect connection, such as by using various connected interfaces and lines to achieve information exchange.

With the increasing security requirements of computing devices, more and more security technologies are being applied to various computing devices. In particular, cryptographic technology has become an important part of the security architecture system. Cryptography has a variety of uses and is a critical part of many security architecture systems. For example, security architecture systems can use cryptographic techniques to prevent attackers from gaining access to important data, forging identities, or tampering with documents. If the security of the information involved in the cryptographic operation cannot be ensured, the security environment of the device will become fragile, and important resources, such as data associated with payments, can easily leak due to software attacks or physical attacks.

Embodiments of the present disclosure provide a security architecture system in which not only security of the device is ensured based on various security level-related subsystems, but also a hardware cryptographic engine arranged in the security architecture system. In addition, between each subsystem and the hardware cryptographic engine, the cryptographic engine is controlled to perform cryptographic operations based on a dedicated access interface, thereby further improving the security of the device on cryptographic operations and reducing the risk of leakage of important information.

Figure 1:
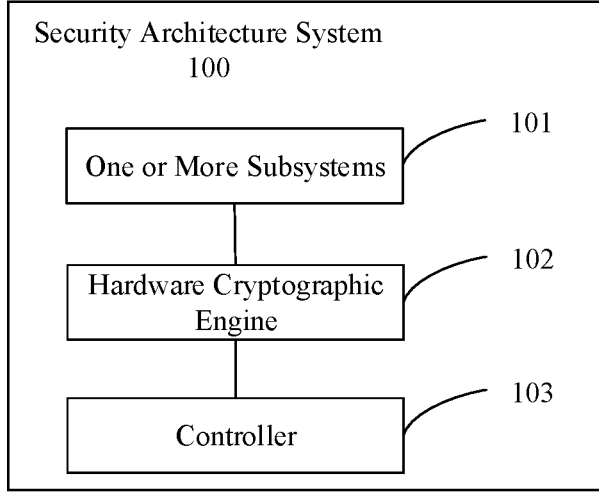
FIG. 1 is a schematic block diagram of a security architecture system according to some embodiments of the present disclosure.

FIG. 1 is a schematic block diagram of a security architecture system according to some embodiments of the present disclosure. As shown in FIG. 1, a security architecture system 100 may include one or more subsystems 101, a hardware cryptographic engine 102, and a controller 103. According to some embodiments of the present disclosure, one or more of the one or more subsystems 101 may have access authority to access the hardware cryptographic engine 102. Subsequently, the controller may instruct the one or more subsystems with the access authority to access the hardware cryptographic engine via the access interface to control the hardware cryptographic engine to perform cryptographic operations.

The security architecture system according to some embodiments of the present disclosure may have three types of subsystems, namely, a rich execution environment (REE) subsystem, a trusted execution environment (TEE) subsystem, and a security element (SE) subsystem. The application running in the REE can be referred to as a client application (CA), which has low security and is vulnerable to attacks. The application running in the TEE can be referred to as a trusted application (TA), and its security is higher than the security of the REE. For example, the trusted application may be used to support functions such as verifying the payment environment in the payment process. The application running in the SE can be referred to as a secure element application (Applet), and its security is the highest among these three types of subsystems. The system security can be ensured through the cooperation between these three types of subsystems. Since the SE has the highest security compared to the REE and the TEE, the SE is generally used to store important resources, such as root keys and other information.

According to some embodiments of the present disclosure, the access authority of each of the subsystems described above to the security architecture system may be controlled based on an access interface. For example, if the REE does not have the access authority to the hardware cryptographic engine, the REE will not have the access interface to the hardware cryptographic engine, thereby avoiding the risk of information leakage from the hardware cryptographic engine due to an attack on the REE. It should be understood that the present disclosure does not limit the specific implementation of the subsystems in the security architecture system provided by the embodiments of the present disclosure. For example, in other embodiments, the security architecture system may also include one or more of the REE, the TEE, and the SE.

The hardware cryptographic engine according to some embodiments of the present disclosure may be configured to support the required cryptographic operation algorithms. For example, the cryptographic operation algorithms may include symmetric cryptographic algorithms, asymmetric cryptographic algorithms, hash algorithms, etc., where the asymmetric cryptographic algorithms are encryption algorithms that use different keys for encryption and decryption.

For example, the hardware cryptographic engine according to some embodiments of the present disclosure may be designed to implement hardware acceleration of asymmetric encryption algorithms. The two keys used in the asymmetric encryption algorithm are the public key and the private key, and the public key and the private key work in pairs. If the public key (or private key) is used to encrypt the data, only the corresponding private key (or public key) can be used to decrypt the data. Asymmetric encryption is widely used in information encryption, login authentication, digital signature, digital certificate, and other fields. For example, when the first user needs to send information to the second user, the second user's public key is generally used for encryption. After the second user receives the encrypted data, the second user can decrypt the encrypted data with his private key, and only the second user can have the private key. When the first user sends a signature to the second user, the first user can encrypt the signature with his private key, and the second user can verify the signature based on the first user's public key. Signing with a private key means that only the information owner can sign, and it is non-repudiation.

In another example, the hardware cryptographic engine according to some embodiments of the present disclosure may be designed to implement hardware acceleration of symmetric encryption algorithms. A symmetric cryptographic algorithm is an encryption algorithm that uses the same key for encryption and decryption. In a symmetric cryptographic algorithm, the data sender uses a key to encrypt the plaintext and sends the encrypted the plaintext, and the data receiver uses the same key to restore the ciphertext to plaintext after receiving the data. In a symmetric cryptographic algorithm, since the sender and the receiver use the same key to encrypt and decrypt data, the security of the encryption depends not only on the encryption algorithm itself, but also on the security of the key. Encryption and decryption generally do not require key exchange in the same system or in a fixed key environment as long as certain access authorities are set to the key. However, when encryption and decryption are in different systems and do not use a fixed key, it is necessary to exchange keys. The symmetric cryptographic algorithm has the characteristics of fast encryption speed and high encryption efficiency, and is suitable for encryption scenarios with a large amount of data.

In another example, the hardware cryptographic engine according to some embodiments of the present disclosure may be designed to implement hardware acceleration of hash algorithms. A hash algorithm, also known as hashing, employs a function that transforms an input message string of arbitrary length into an output string of fixed length. The hash algorithm's process of generating the hash value is unidirectional, the reverse operation is difficult to complete, and the probability of collision (two different inputs producing the same hash value) is very low. Hash algorithm plays an important role in modern cryptography. In the hash algorithm, the same ciphertext can only be obtained by entering the same plaintext, which is generally used in fields such as data integrity verification, identity authentication, digital signatures, key derivation, message authentication codes, etc.

In addition, the hardware cryptographic engine according to some embodiments of the present disclosure may be designed to implement true random number generation. In cryptosystems, the keys in symmetric encryption algorithms, and the prime numbers and the keys in asymmetric encryption algorithms all require random numbers. Therefore, the hardware cryptographic engine may be configured to include a dedicated source of physical randomness to generate the required random numbers.

It should be understood that, the hardware cryptographic engine according to some embodiments of the present disclosure may have one or more of the various encryption algorithms described above, and may also be used to implement other encryption algorithms or function, which are not limited in the present disclosure.

The controller according to some embodiments of the present disclosure may be implemented as a processor such as a system-on-chip (SOC). That is, the subsystems with the access authority may be controlled by the processor, for example, by instructions, and the hardware cryptographic engine can be instructed to perform the cryptographic operations via the access interface. Alternatively, the controller may also be implemented inside the security architecture system, which is not limited by the embodiments of the present disclosure. It should be understood that, the controller may realize the instruction to the subsystem in the form of software or hardware, such that the subsystem can perform the relevant actions based on the instruction initiated by the controller. In addition, the instruction of the controller to each subsystem may be a direct instruction or an indirect instruction, which is not limited by the embodiments of the present disclosure.

In the security architecture system 100 according to some embodiments of the present disclosure, the subsystem having the access authority to access the hardware cryptographic engine may have an access interface with the hardware cryptographic engine. Subsequently, the subsystem with the access authority may be instructed via the controller to access the hardware cryptographic engine via the access interface, thereby controlling the hardware cryptographic engine to perform cryptographic operations. By setting the access interface to realize the access control to the hardware cryptographic engine, the system can perform cryptographic operations in hardware more flexibly, and the performance of the cryptographic operations can be improved, thereby meeting the needs of many application scenarios.

Figure 2:
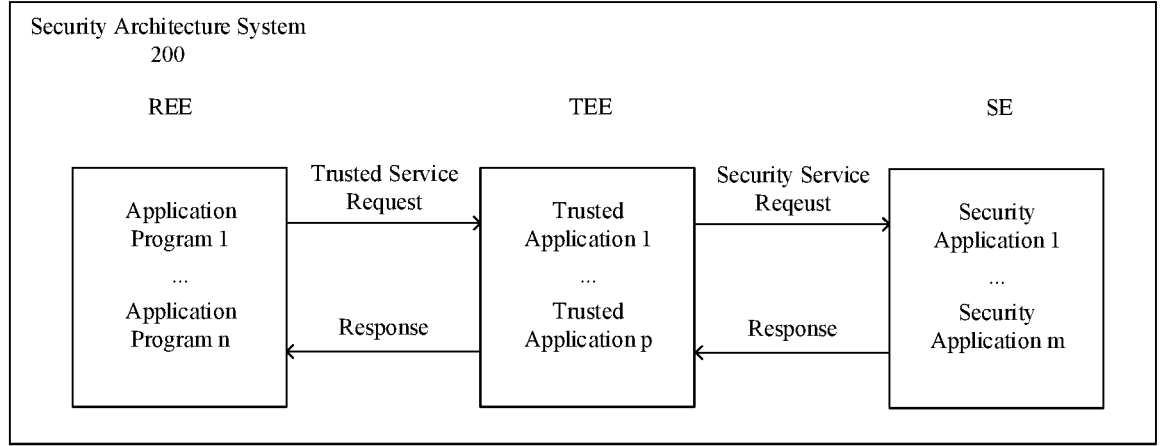
FIG. 2 is a schematic block diagram of the security architecture system with respect to the subsystems.

In order to describe the technical solutions of the security architecture system according to some embodiments of the present disclosure more clearly, a security architecture system including the three subsystems of REE, TEE, and SE is described below with reference to FIG. 2. As shown in FIG. 2, a security architecture system 200 includes the three subsystems described above. In some embodiments, the three subsystems may also be referred to as three application environments. It should be understood that the specific implementation structure of the security architecture system according to some embodiments of the present disclosure is not limited to the scenario shown in FIG. 2. For example, the security architecture system may include only one of REE and TEE. In other possible implementations, REE and TEE may be implemented as a whole as a subsystem, which is not limited by the embodiments of the present disclosure.

More specifically, the REE may include a general operating system running on a general-purpose embedded processor, in which application programs, such as application program 1 to application program n shown in FIG. 2, are installed. An application program may be a program involving payment scenarios, in which basic services such as browsing items, selecting items, submitting order, etc. are implemented. Although many security measures such as device access control, device data encryption mechanism, application runtime isolation mechanism, and permission verification-based access control are adopted in the REE, the security of important data in applications cannot be ensured.

The TEE may be an independent operating environment running outside the general operating system, which can provide trusted service such as the REE and be isolated from the REE. That is, the REE and the applications thereon cannot directly access the hardware and software resources of the TEE. Trusted applications, such as trusted applications 1 to trusted application p shown in FIG. 2, may be executed in the TEE to provide a trusted operating environment for the REE through the trusted applications, and ensure end-to-end security through the protection of confidentiality and integrity and the control of data access authority. In addition, the TEE may run in parallel with the REE and interact with the REE through an application programming interface (API).

The TEE provides a more security operating environment than the REE, but cannot provide a secure key storage and key operating environment with hardware-level isolation. Generally, the TEE can provide many APIs for the REE, such that the REE can call the resources of the TEE. The more APIs the TEE provides for services, the greater the risk the TEE will face. It is difficult to ensure that the API itself does not have security risks, such as security vulnerabilities, which will lead to security risks in resources such as keys in the TEE. Further, a variety of Tas will run on the TEE, and the Tas are completely dependent on the isolation mechanism provided by the TEE operating system. Without hardware-level isolation, if the TA itself has security vulnerabilities or the TA itself actively accesses the keys or root keys corresponding to other Tas, it will also lead to a greater security risk for sensitive resources such as keys.

A trusted and secure resource storage and computing environment may also be established based on the SE. Generally, the software system in the SE is relatively simple, including fewer hardware components. Therefore, it is easy to establish physical protection and implement security measures, thereby improving the security strength of the SE to serve security systems with higher security requirements. In some embodiments, the security applications, such as security application 1 to security application m, can be implemented in the SE.

It should be understood that, the security architecture system provided by some embodiments of the present disclosure may have three subsystems of REE, TEE, and SE as shown in FIG. 2, or may have other subsystem structures, such as only including the REE and SE subsystems, which are not limited in the embodiments of the present disclosure.

Next, a computing device that can adapt the security architecture system according to some embodiments of the present disclosure will be described.

The computing device may be a mobile terminal, a desktop computer, a tablet computer, a personal computer (PC), a personal digital assistant (PDA), a smart watch, a netbook, a wearable electronic device, an augmented reality (AR) device, etc. that can install applications and implement the corresponding application functions. The present disclosure does not limit the specific form of the computing device.

Figure 3A:
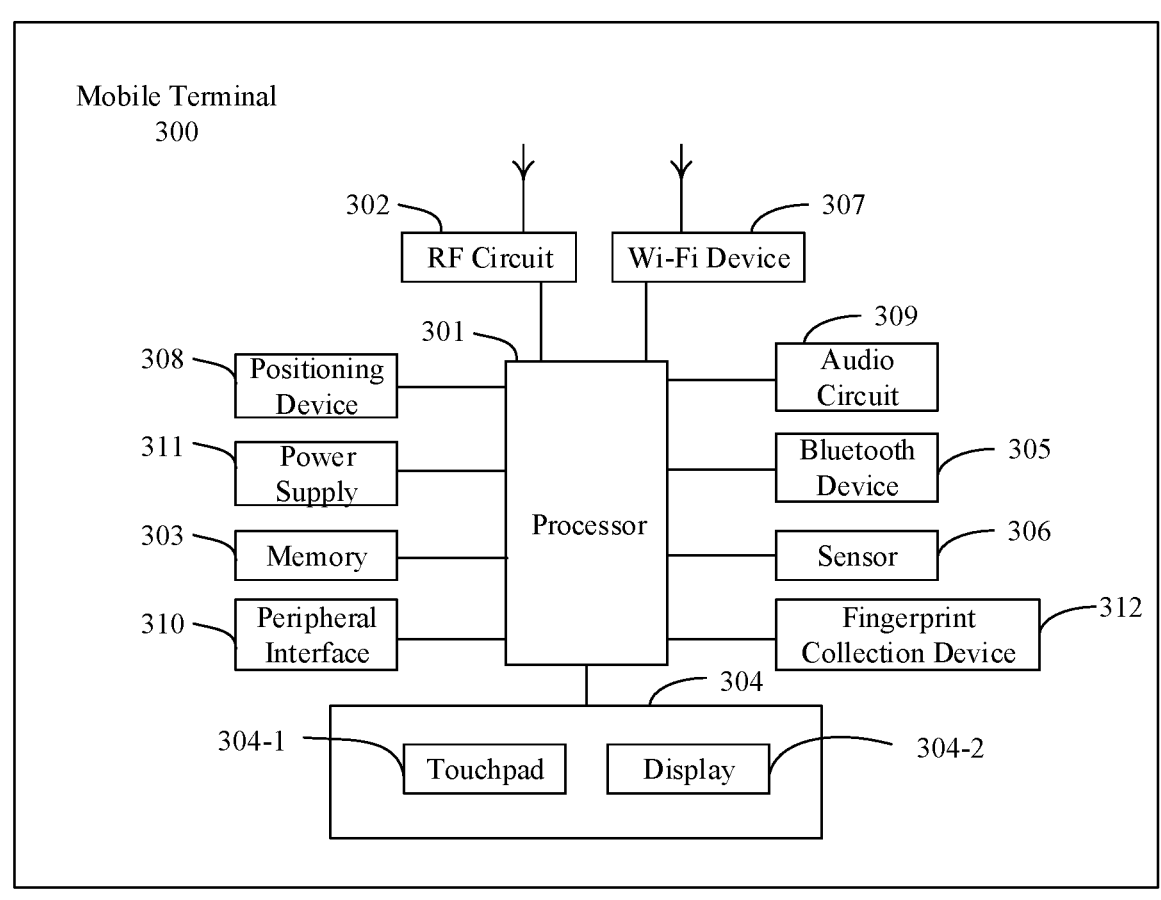
FIG. 3A is a schematic diagram of a terminal device that uses the security architecture system provided by some embodiments of the present disclosure.

In some embodiments, the security architecture system provided by the embodiments of the present disclosure may be implemented in a mobile terminal 300 as shown in FIG. 3A.

As shown in FIG. 3A, the mobile terminal 300 includes a processor 301, a radio frequency (RF) circuit 302, a memory 303, a touch display screen 304, a Bluetooth device 305, one or more sensors 306, a wireless fidelity (Wi-Fi) device 307, a positioning device 308, an audio circuit 309, a peripheral interface 310, and a power supply 311. These components may communicate vis one or more communication buses or signal lines. Those skilled in the art can understand that the hardware structure shown in FIG. 3A does not constitute a limitation on the mobile terminal. The mobile terminal 300 may include more or less components, combine some components, or arrange the components differently.

Each component of the mobile terminal 300 will be described in detail below with reference to FIG. 3A.

First, the processor 301 is the control center of the mobile terminal 300. The processor 301 may use various interfaces and lines to connect various parts of the mobile terminal 300. The processor 301 may be configured to execute various functions of the mobile terminal 300 and process data by running or executing the application programs stored in the memory 303 and calling the data stored in the memory 303. In some embodiments, the processor 301 may include one or more processing units. For example, the processor 301 may be various types of processor chips.

The RF circuit 302 may be used to receive and transmit wireless signals in the process of sending and receiving information or calling. In particular, the RF circuit 302 may receive the downlink data of the base station, send the data to the processor 301 processing, and send the data related to the uplink to the base station. Generally, the RF circuit may include, but is not limited to, antennas, at least one amplifier, transceivers, couplers, low noise amplifiers, duplexers, etc. In addition, the RF circuit 302 may also communicate with other devices through wireless communication. The wireless communication may use any communication standard or protocol, including but not limited to, global system for mobile communications, general packet radio service, code division multiple access, wideband code division multiple access, long term evolution, email, short message service, etc.

The memory 303 may be used to store application programs and related data. The processor 301 may be configured to perform various functions and data processing of the mobile terminal 300 by running the application programs and the data stored in the memory 303. The memory 303 may include a program storage area and a data storage area. The program storage area can store an operating system and an application program required for at least one function (e.g., an application program for implementing an online shopping function). The data storage area can store data (e.g., products browsing data, order data, etc.) created based on the user of the mobile terminal 300. In addition, the memory 303 may include a high-speed random-access memory (RAM), and may also include a non-volatile memory, such as a magnetic disk storage device, a flash memory device, or other volatile solid-state storage devices. The memory 303 may store various operating systems. The memory 303 may be independent and connected to the processor 301 through a communication bus. In addition, the memory 303 may also be integrated with the processor 301.

The touch display screen 304 may include a touchpad 304-1 and a display 304-2.

In some embodiments, the touchpad 304-1 may be configured to collect touch operations (which can also be referred to as touch events) on or near the user of the mobile terminal 300, and send the collected touch information to other devices (e.g., the processor 301). For example, the user may use any suitable object such as a finger, a stylus, etc. to perform an operation on or near the touchpad 304-1. A user's touch event near the touchpad 304-1 may be referred to as a hovering touch. The hovering touch may indicate that the user does not need to directly touch the touchpad 304-1 in order to select, move, or drag objects (e.g., icons), but the user only needs to be in the vicinity of the device in order to perform the desired function. In addition, various types of resistive, capacitive, infrared, and surface acoustic waves can be used to implement the touchpad 304-1.

The display (which can also be referred to as a display screen) 304-2 may be used to display information input by the user or information provided to the user, and various menus of the mobile terminal 300. The display 304-2 may be configured in the form of a liquid crystal display, an organic light-emitting diode, etc. The touchpad 304-1 may be overlaid on the display 304-2, and when the touchpad 304-1 detects a touch event on or near the touchpad 304-1, the detected event may be sent to the processor 301 to determine the parameters of the touch event. Subsequently, the processor 301 may provide the corresponding output data, for example, a product list, on the display 304-2 based on the parameters of the touch event. Although in FIG. 3A, the touchpad 304-1 and the display 304-2 are used as two independent components to realize the input and output function of the mobile terminal 300, but in some embodiments, the touchpad 304-1 may be integrated with the display 304-2 to realize the input and output functions of the mobile terminal 300. It should be understood that the touch display screen 304 is formed by stacking multiple layers of materials. Only the touch panel (layer) and the display screen (layer) are shown in FIG. 3A, and other layers are not described in FIG. 3A. In addition, the touchpad 304-1 may be arranged on the front of the mobile terminal 300 in the form of a full panel, and the display 304-2 may also be arranged on the front of the mobile terminal 300, such that a frameless structure can be realized on the front of the terminal device.

Further, the mobile terminal 300 may also include a fingerprint recognition function. For example, a fingerprint collection device 312 may be arranged on the back of the mobile terminal 300 (e.g., under the rear camera), or the fingerprint collection device 312 may be arranged on the front of the mobile terminal 300 (e.g., under the touch display screen 304). In another example, the fingerprint collection device 312 may be arranged in the touch display screen 304 to realize the fingerprint recognition function. That is, the fingerprint collection device 312 may be integrated with the touch display screen 304 to realize the fingerprint recognition function of the mobile terminal 300. Accordingly, the fingerprint collection device 312 may be arranged in the touch display screen 304, and may be a part of the touch display screen 304 or may be arranged in the touch display screen 304 in other ways. The main component of the fingerprint collection device 312 may be a fingerprint sensor, and the fingerprint sensor may adopt any type of sensing technology, including but not limited to optical, capacitive, piezoelectric, or ultrasonic sensing technologies.

The mobile terminal 300 may further include a Bluetooth device 305 for realizing data exchange between the mobile terminal 300 and other short-range devices (e.g., mobile phones, smart watches, etc.). More specifically, the Bluetooth device 305 may be an integrated circuit or a Bluetooth chip.

The mobile terminal 300 may also include at least one sensor 306, such as an optical sensor, a motion sensor, and other sensors. More specifically, the optical sensor may include an ambient light sensor and a proximity sensor. The ambient light sensor can adjust the brightness of the display of the touch display screen 304 based on the brightness of the ambient light, and the proximity sensor can turn off the power of the display when the mobile terminal 300 is moved to the ear. As a type of motion sensor, an accelerometer sensor can detect the magnitude of acceleration in all directions (generally three axes), detect the magnitude and direction of gravity when it is stationary, and can be used for applications that recognize the attitude of the mobile phone (e.g., horizontal and vertical screen switching, related games, magnetometer attitude calibration), and vibration recognition related functions (e.g., pedometer, tap), etc. The mobile terminal 300 may also be configured with other sensors such as a gyroscope, a barometer, a hygrometer, a thermometer, an infrared sensor, etc., which will not be described in detail here.

The Wi-Fi device 307 can be used to provide the mobile terminal 300 with network access following the Wi-Fi related standard protocol. The mobile terminal 300 may access the Wi-Fi access point through the Wi-Fi device 307, thereby assisting the user to receive and send data, such as sending and receiving emails, browsing the web, and accessing streaming media, etc., which provides the user with wireless broadband Internet access. In other embodiments, the Wi-Fi device 307 may also act as a Wi-Fi wireless access point, and may provide Wi-Fi network access for other devices.

The positioning device 308 may be used to provide the mobile terminal 300 with geographic location information. It should be understood that the positioning device 308 may be a receiver of a positioning system, such as the global positioning system (GPS), the Beidou satellite navigation system, the Russian GLONASS, etc. After receiving the geographic location information sent by the position system, the positioning device 308 may, for example, send the information to the processor 301 for processing, or send the information to the memory 303 for storage. In some embodiments, the positioning device 308 may also be a receiver of an assisted global positioning system (AGPS), and the AGPS may act as an auxiliary server to assist the position device 308 to complete ranging and positioning services. Accordingly, the assisted positioning server may provide positioning assistance by communicating with a device such as a positioning device 308 (e.g., a GPS receiver) of the mobile terminal 300 over a wireless communication network. In some embodiments, the positioning device 308 may also be a positioning technology based on a Wi-Fi access point. Since each Wi-Fi access point has a globally unique media access control (MAC) address, when the Wi-Fi is turned on, the terminal device may scan and collect the broadcast signals of the surrounding Wi-Fi access points to obtain the MAC addresses broadcast by the Wi-Fi access points. The terminal device may send the data (e.g., the MAC addresses) that can identify the Wi-Fi access points to a location server through the wireless communication server. The location server may retrieve the geographic location of each Wi-Fi access point, and combine the strength of the Wi-Fi broadcast signal to calculate the geographic location of the terminal device and send it to the positioning device 308 of the terminal device.

The audio circuit 309 may be a speaker and a microphone for providing an audio interface between the user and the mobile terminal 300. On one hand, the audio circuit 309 may convert the received audio data into electrical signals, and transmit the electrical signals to the speaker to convert the electrical signals into sound signals for output. On the other hand, the microphone may convert the collected sound signals into electrical signals, which may be received by the audio circuit 309 to converted into audio data. The audio data may be output to the RF circuit 302 for transmission to, for example, another device, or to the memory 303 for further processing.

The peripheral interface 310 may be used to provide various interfaces for external input/output devices (e.g., keyboards, mouses, external displays, external memories, subscriber identification module cards, etc.). For example, a mouse can be connected through a universal serial bus (USB) interface, and a subscriber identification module (SIM) provided by a telecom provider can be through the metal contacts on the card slot of the SIM. The peripheral interface 310 may be used to couple the external input/output peripherals to the processor 301 and the memory 303.

The mobile terminal 300 may also include a power device 311 (such as a battery and a power management chip) for supplying power to various components. The battery may be logically connected to the processor 301 through the power management chip, such that the functions of charging and discharging management and power consumption management can be realized through the power supply 311.

Although not shown in FIG. 3A, the mobile terminal 300 may further include a camera (a front camera and/or a rear camera), a flash, a pico-projection device, a near field communication (NFC) device, etc., which will not be described in detail here.

The security architecture system described in each of the following embodiments can be implemented in the mobile terminal 300 having the hardware structure described above. Nonetheless, it can be understood that the security architecture system described herein can also be applied to other suitable computing devices, and is not limited to the mobile terminal described in conjunction with FIG. 3A.

Figure 3B:
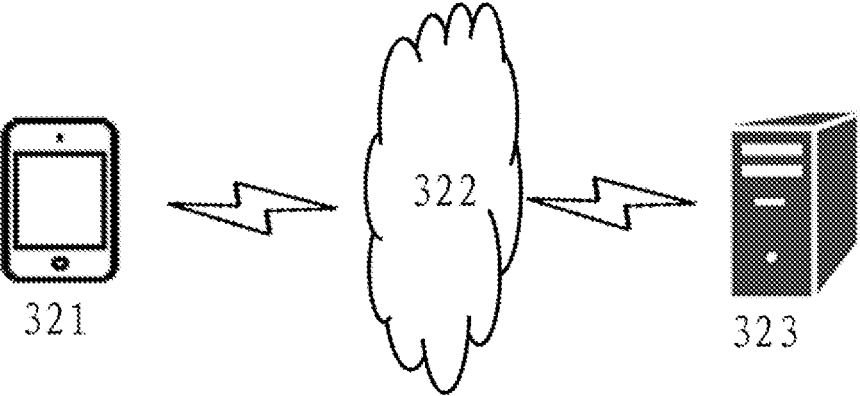
FIG. 3B is a schematic system diagram that adapts the security architecture system provided by some embodiments of the present disclosure.

FIG. 3B is a schematic system diagram that adapts the security architecture system provided by some embodiments of the present disclosure. As shown in FIG. 3B, the application system may include a terminal device 321, a network 322, and a server 323.

The terminal device 321 may be the illustrated mobile terminal or a fixed terminal, configured to perform data transmission with the server 323 through the network 322. The security architecture system according to some embodiments of the present disclosure may be arranged on the terminal device 321 (e.g., as shown in FIG. 1). In addition, various applications may also be installed on the terminal device 321, such as shopping applications, web browsing applications, video playback applications, news applications, etc. In addition, the terminal device 321 may include an input/output device, such that the terminal device 321 can receive user operations, such as receiving the user's touch and gesture operations through the touch display screen, or receiving the user's voice operation through a microphone. Then, the terminal device 321 may generate a request message based on the received operation. Through the network 322, the terminal device 321 may send the request message to the server 323, and receive the data returned by the server 323 in response to the request message. The terminal device 321 may display based on the data returned by the server 323, for example, display the received display data, such as a video or an image, on the display of the terminal device 321. In addition, the received data may also include other information, such as the display time point and the display duration of the video. Alternatively, the server 323 may also directly send the data to the terminal device 321 without receiving the request message, thereby performing a corresponding processing process on the terminal device 321.

The terminal device 321 may be various devices having a display and supporting program execution. As described above, the terminal device 321 may be the illustrated mobile terminal, such as the mobile terminal having the components described above in conjunction with FIG. 3A. As other examples, the terminal device 321 may also be a smart TV, a tablet computer, an e-book reader, a moving picture experts group audio layer IV (MP4) player, a laptop computer, a desktop computer, etc. In addition, the terminal device 321 may also implement the functions of each module in the form of software, which is not limited in the embodiments of the present disclosure.

The network 322 may be a wired network or a wireless network, which is not limited by the embodiments of the present disclosure. The server 323 may be a server that provides various services, such as receiving the data stream sent by the terminal device 321 and performing buffering. In addition, the server 323 may also receive the request message sent by the terminal device 321, analyze the request message, and send the analysis result (e.g., a data stream corresponding to the request message) to the terminal device 321. Different servers may be arranged based on different application types. For example, the server 323 may be an instant message server, a payment application server, an information display application server, a resource management server, etc. It should be understood that the numbers of terminal device 321, network 322, and server 323 shown in FIG. 3B are only illustrative. Based on the specific application scenario, there can be any number of terminal devices, networks, and servers.

Hereinafter, the security architecture system according to some embodiments of the present disclosure will be described with respect to the subsystem arrangement shown in FIG. 3A as a specific example to the security architecture system. It should be understood that the arrangement of the subsystems included in the security architecture system according to some embodiments of the present disclosure is not limited thereto.

According to some embodiments of the present disclosure, one or more subsystems (such as the subsystem 101 shown in FIG. 1) may include a first execution environment subsystem and a secure element subsystem. According to some embodiments of the present disclosure, the first execution environment subsystem may not have the access authority to access the hardware cryptographic engine, and the secure element subsystem may have the access authority to access the hardware cryptographic engine and may access the hardware cryptographic engine via a first access interface.

More specifically, the first execution environment subsystem may include at least one of a REE subsystem or a TEE subsystem. In some embodiments, the first execution environment subsystem may include both the REE and the TEE. That is, both REE and TEE may not have the access authorities to access the hardware cryptographic engine. In the case that both subsystems require cryptographic operations, the hardware cryptographic engine may be controlled to perform the corresponding processing by requesting the secure element subsystem with the access authority.

Through the access control method based on the access interface, the resources associated with cryptographic operations can be isolated from other subsystems with low security such as REE and TEE. In the case of ensuring the normal implementation of application functions, access to resources can be controlled to avoid resource leakage, such as during key usage.

Next, the implementation process of performing cryptographic operations based on the security architecture system will be described in detail with reference to the accompanying drawings.

Figure 4:
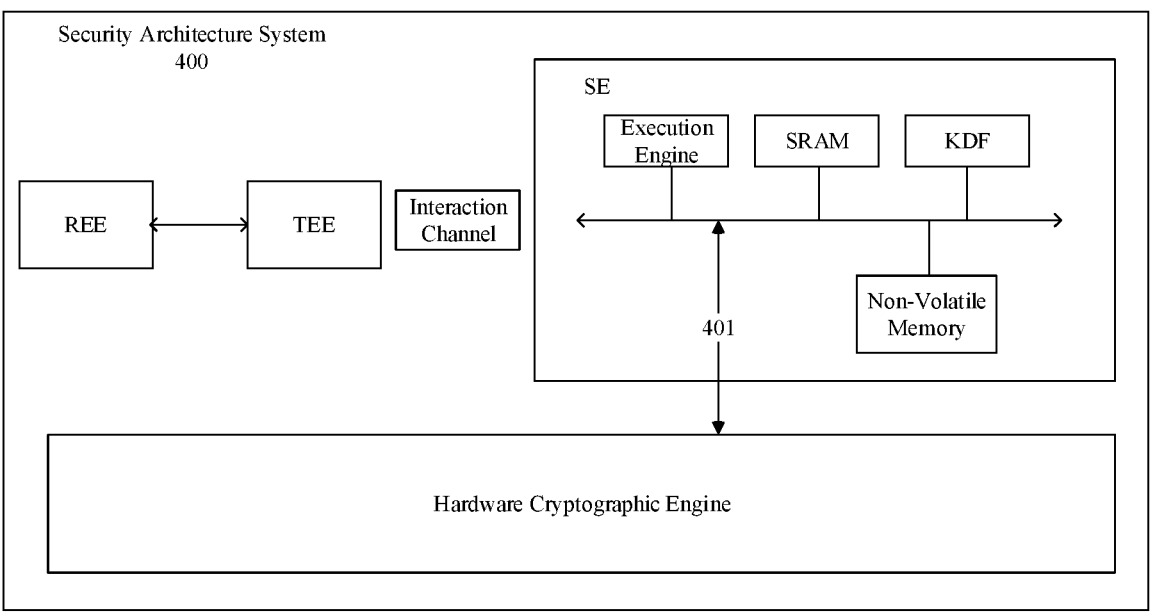
FIG. 4 is a schematic block diagram of the security architecture system according to some embodiments of the present disclosure.

FIG. 4 is a schematic block diagram of the security architecture system according to some embodiments of the present disclosure. As shown in FIG. 4, a security architecture system 400 includes three subsystems REE, TEE, and SE, where REE, TEE, and SE may interact through interaction channels to transmits, for example, data and request messages. For example, there may be no physical path for the REE and the TEE to directly access the SE, and the REE and the TEE may only make requests to the SE through interactive methods such as shared memory, for the SE to provide services to the REE and the TEE. The SE may include an execution engine, a static random-access memory (SRAM), a non-volatile memory, and a key derivation function (KDF). In some embodiments, important resources such as the root key may be stored in the non-volatile memory within the SE to ensure the root key does not have a software of hardware path out of the SE through the SE firmware or hardware. In addition, the KDF integrated in the SE may be implemented as software or hardware, and used to generate a derived key based on the root key. For example, the KDF may be a hash function, which is commonly used to turn short passwords into long passwords.

More specifically, the shared memory may be a large capacity memory that can be accessed by different processors in a multi-processor computer system. Since multiple processors require fast access to the memory, the memory can be cached. After any cached data is updated, since other processors may also need to access the cached data, the shared memory is updated immediately, otherwise different processors may use different data. In the security architecture system 400 shown in FIG. 4, only the SE has the authority to access the hardware cryptographic engine, and accesses the hardware cryptographic engine via an access interface 401. In addition, first execution environment subsystem may not have the access authority to directly access the hardware cryptographic engine. That is, the first execution environment subsystem may not have the corresponding direct access interfaces. In some embodiments, the first execution environment subsystem may include at least one of a REE or a TEE.

It should be understood that, in the security architecture system according to the embodiments of the present disclosure, for the subsystems that do not have the access authority, the corresponding direct access interface may not be configured during implementation. Alternatively, the corresponding direct access interface may be set for the REE, the TEE, and the SE. In the case of no access authority, the corresponding access interface may be turned off through instructions or hardware, which is not limited by the embodiments of the present disclosure. For example, in the embodiment shown in FIG. 4, the access interface of the REE and the TEE to the hardware cryptographic engine is turned off. Correspondingly, the direct access interface of the REE and the TEE to the hardware cryptographic engine is not shown in FIG. 4.

In some embodiments, when the SE needs to perform cryptographic operations based on the hardware cryptographic engine, the SE may directly instruct the hardware cryptographic engine to perform the corresponding cryptographic operations via the access interface 401. In some embodiments, the cryptographic operations may include causing the hardware cryptographic engine to encrypt data based on a key provided via the access interface 401. For example, the data that needs to be encrypted may be provided to the hardware cryptographic engine via the hardware cryptographic engine via the access interface 401. In another example, the data may also be stored in a memory accessible to a certain hardware cryptographic engine, and the SE may only indicate the storage address of the data in the memory to the hardware cryptographic engine.

In some embodiment, when the REE or the TEE needs to perform cryptographic operations based on the hardware cryptographic engine, the SE may be requested to provide a cryptographic operation service.

According to some embodiments of the present disclosure, the first execution environment subsystem may be configured to send a cryptographic operation request to the secure element subsystem in response to an instruction from the controller. The cryptographic operation request may indicate key information and data information for performing the cryptographic operation. The secure element subsystem may be configured to obtain the cryptographic operation request from the first execution environment subsystem, and transmit the key information and the data information to the hardware cryptographic engine via the first access interface. Accordingly, the hardware cryptographic engine can perform cryptographic operations on the data information based on the key information.

Specifically, the TEE is used as the first execution environment subsystem described above for description. First, the TEE may send a cryptographic operation request to the SE. The cryptographic operation request may carry key-related information and related information of data to be encrypted and decrypted. The key-related information may be the key identifier stored in the SE, parameters used for key derivation, etc. In some embodiments, the cryptographic operation request may directly carry the to-be-encrypted data, or may also carry parameters such as the address and size of the data block.

Next, the SE may transmit the key corresponding to the key identifier and the data-related information to the hardware cryptographic engine via the access interface 401 to perform the corresponding cryptographic operations.

According to some embodiments of the present disclosure, the secure element subsystem may be further configured to obtain an operation result of the cryptographic operation performed by the hardware cryptographic engine via the first access interface, and store the operation result in the shared memory. The first execution environment subsystem may be further configured to obtain the operation result of the cryptographic operation performed by the hardware cryptographic engine from the shared memory. Since the TEE may not have an access interface to directly access the hardware cryptographic engine, the operation result may also be obtained through the SE via the access interface 401 and passed back to the TEE through the shared memory between the Se and the TEE. That is, the TEE may obtain the requested cryptographic operation result from the shared memory.

According to some embodiments of the present disclosure, after receiving the cryptographic operation request from the TEE, the SE may also be configured to determine the key-related information. If the key identifier is carried in the request, whether the requesting party (i.e., the TEE) has the authority to use the key may be determined (such as by verifying the certificate, etc.). In response to the TEE having the access authority, the key may be transmitted to the cryptographic engine. In response to the TEE not having the access authority, transmitting the key to the cryptographic engine may be denied.

The key authentication process implemented by the SE describe above can further ensure the security of the root key requested for performing cryptographic operations, and prevent the TEE without the access authority from performing the corresponding unauthorized operations based on the root key, which reduces the system security.

In addition, if the cryptographic operation request carries the parameters for key derivation (e.g., the identity of the root key, the length of the derived key, the rounds of the derived key, etc.), the SE may use the KDF to perform the key derivation process based on the parameters of the key derivation, and send the generated derived key and data information to the hardware cryptographic engine for operation. Further, the SE may also authenticate the root key in the parameters used for key derivation similarly as described above, to determine whether the requester TEE has the authority to use the root key for key derivation, thereby ensuring the security of the root key and its derived keys.

In the above embodiment, the hardware cryptographic engine may only be accessed by the SE, while the REE and the TEE may only request the SE to provide the corresponding cryptographic operation service. Since the SE firmware is relatively small and is generally developed and provided by chip manufacturers, its risk of security vulnerabilities is extremely low compared to the TEE or the REE. Therefore, the security architecture system in the above embodiment can effectively protect the security of resources such as root keys.

Figure 5:
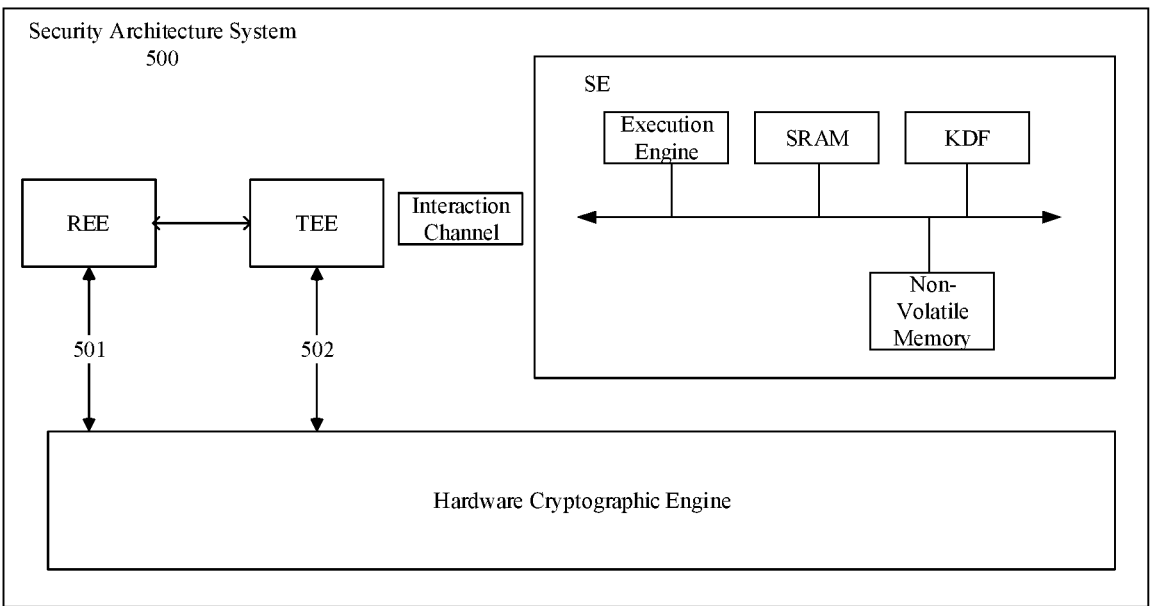
FIG. 5 is another schematic block diagram of the security architecture system according to some embodiments of the present disclosure.

FIG. 5 is another schematic block diagram of the security architecture system according to some embodiments of the present disclosure. Compared with the block diagram shown in FIG. 4, FIG. 5 only differs in the manner of the access interface of the subsystem to the hardware cryptographic engine.

In a security architecture system 500 shown in FIG. 5, the first execution environment subsystem includes the TEE and the REE. The first execution environment subsystem may have the access authority to access the hardware cryptographic engine, and access the hardware cryptographic engine via a second access interface. As shown in FIG. 5, the REE with the access authority can access the cryptographic engine via an interface 501, and the TEE with the access authority can access the cryptographic engine via an interface 502. The SE does not have the access authority to directly access the hardware cryptographic engine, and accordingly, the SE does not have the access interface to directly access the hardware cryptographic engine. In the following description of FIG. 5, only the structures different from those in FIG. 4 and the processes of their implementation will be described, and the parts similar to those in FIG. 4 will not be repeated.

According to some embodiments of the present disclosure, the first execution environment subsystem (the TEE or the REE) may be configured to request the key information for performing the cryptographic operation from the SE subsystem in response to the instruction of the controller. The first execution environment subsystem may also be configured to send the key information and the data information to the hardware cryptographic engine via the second access interface (the interface 501 and the interface 502) for the hardware cryptographic engine to perform a cryptographic operation on the data information based on the key information, and obtain the operation result of the cryptographic operation performed by the hardware cryptographic engine via the second access interface.

In the above embodiment, when the REE or the TEE needs to perform cryptographic operations based on the hardware cryptographic engine, since it has a corresponding direct access interface, the hardware cryptographic engine may be directly instructed to perform the cryptographic operations via the respective access interface. For example, the REE and the TEE may send the corresponding key information and data information to the hardware cryptographic engine via the interface 501 and the interface 502, respectively. Further, after the hardware cryptographic engine completes the operation, the REE and the TEE may directly obtain the operation result through their respective access interfaces. Furthermore, the interface 501 corresponding to the REE and the interface 502 corresponding to the TEE may be isolated from each other. For example, the TEE may not have the capability to access the hardware cryptographic engine via the interface 501. By isolating the hardware interface, the access of the TEE and the REE, and the data information involved can be isolated to reduce data security risks.

Compared with the scenario shown in FIG. 4, the TEE and the REE may have the authority to directly access the hardware cryptographic engine. Therefore, there is no need to request the SE to implement the corresponding cryptographic operation via the interface 401 described above, which is beneficial to improve the operation efficiency. In addition, as described above, for a security architecture system including the REE, the TEE, and the SE, since the security level of the SE is higher than the security level of the REE and the TEE, important resource, such as user root keys, are generally stored in the SE. In the process that the TEE or the REE needs to perform cryptographic operations, the key used for encryption may be the root key stored in the SE. Therefore, before instructing the hardware cryptographic engine to perform the cryptographic operations, the REE or the TEE may need to request the SE for key information for performing the cryptographic operations.

According to some embodiments of the present disclosure, the secure element subsystem may be configured to, for a request for the key information for performing the cryptographic operation, send the key information to the first execution environment subsystem via the shared memory in response to the first execution environment subsystem having the access authority to use the key information. The key information may include a derived key generated based on the root key indicated by the request.

Take the TEE as an example. First, the TEE may send a key request to the SE to request the SE to provide the corresponding key information. Next, the SE may verify the access authority of the TEE for the key, and in response to the request TEE having the access authority, the key may be derived based on the root key corresponding to the request, and the derived key may be provided to the TEE via the shared memory.

In the above embodiment, the hardware cryptographic engine may only be accessed by the TEE or the REE, and may not be directly accessed by the SE. The REE and the TEE may directly instruct the hardware cryptographic engine to perform cryptographic operations. In addition, in the case where the key-related information used for encryption is stored in the SE, the TEE or the REE may request the SE to provide a corresponding key derivation service to instruct the corresponding cryptographic operation based on the derived key. First, since the SE firmware is relatively small and is generally developed and provided by chip manufacturers, its risk of security vulnerabilities is extremely low compared to the TEE or the REE. Therefore, in the security architecture system in the above embodiment, the important resources stored by the SE do not have an interface or a path to the outside of the SE. In the case where some information stored in the SE (such as the root key) needs to be used, a derived key may be generated based on the SE's KDF and used for the corresponding computation. Accordingly, the risk of leakage of important resources stored in the SE can be voided, and the security of resources such as root keys can be effectively protected.

Figure 6:
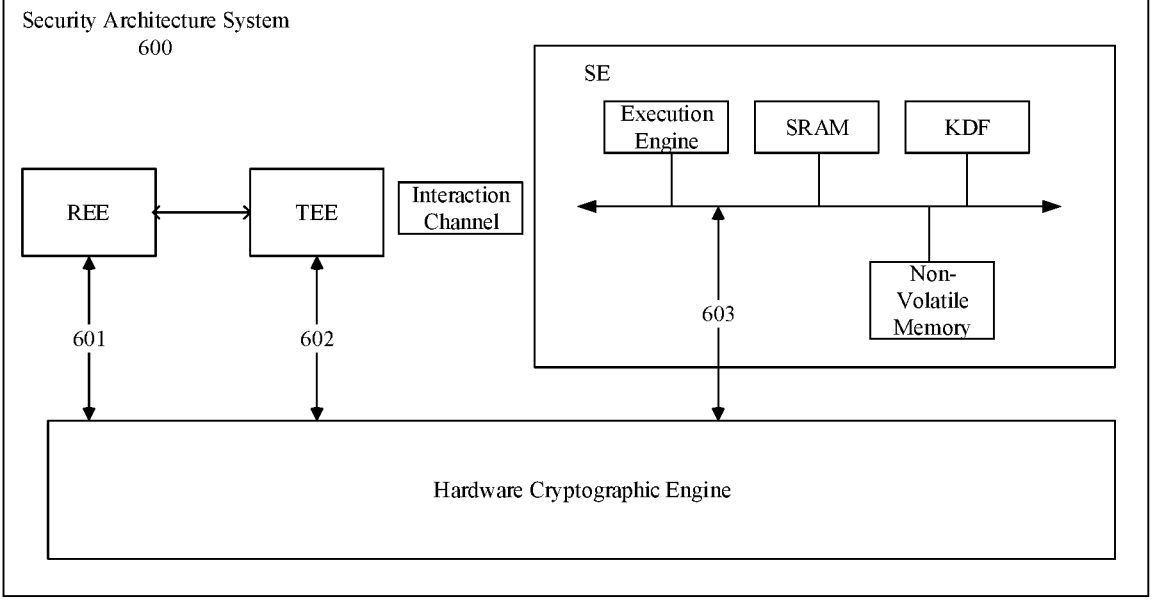
FIG. 6 is another schematic block diagram of the security architecture system according to some embodiments of the present disclosure.

FIG. 6 is another schematic block diagram of the security architecture system according to some embodiments of the present disclosure. Compared with the block diagram shown in FIG. 4 or FIG. 5, FIG. 6 only differs in the manner the subsystem accesses the hardware cryptographic engine.

In a security architecture system 600 shown in FIG. 6, the first execution environment subsystem includes the TEE and the REE. The first execution environment subsystem may have the access authority to access the hardware cryptographic engine, and may access the hardware cryptographic engine via a third access interface. In addition, the secure element subsystem may also have the access authority to access the hardware cryptographic engine, and may access the hardware cryptographic engine via a fourth access interface. As shown in FIG. 6, the REE with the access authority can access the cryptographic engine via an interface 601, and the TEE may access the cryptographic engine via an interface 602. In addition, the SE may also have the access authority to access the hardware cryptographic engine, and accordingly, the SE may access the hardware cryptographic engine via an interface 603.

According to some embodiments of the present disclosure, the first execution environment subsystem (the REE and the TEE) may be configured to request the secure element subsystem for key information (i.e., send a key information request) for performing cryptographic operations in response to the controller's instruction, and send the data information to the hardware cryptographic engine via the third access interface for the hardware cryptographic engine to perform cryptographic operations on the data information based on the key information.

According to some embodiments of the present disclosure, the secure element subsystem may be configured to, upon receiving the key information request for performing the cryptographic operation, send the key information to the hardware cryptographic engine via the fourth access interface in response to the first execution environment subsystem having the access authority to use the key information for the hardware cryptographic engine to perform the cryptographic operation on the data information based on the key information. The key information includes a derived key generated based on the root key indicated by the request. Further, the first execution environment subsystem may be further configured to obtain the operation result of the cryptographic operation performed by the hardware cryptographic engine via the third access interface.

In the embodiment shown in FIG. 6, the three subsystems REE, TEE, and SE of the security architecture system each have their own direct access interface to access the cryptographic engine. For example, if the SE needs to perform cryptographic operations based on the hardware cryptographic engine, the SE may directly instruct the hardware cryptographic engine to perform the corresponding cryptographic operations via the access interface 603. In some embodiments, the cryptographic operations may include causing the hardware cryptographic engine to encrypt data based on the key provided via the access interface 603. Next, the SE may obtain the encryption operation result via the interface 603.

In another example, when the REE or the TEE needs to perform cryptographic operations based on the hardware cryptographic engine, since it has a corresponding access interface, the hardware cryptographic engine may be directly instructed to perform the cryptographic operations via the respective access interface. For example, the REE and the TEE may send the corresponding key information and data information to the hardware cryptographic engine via the interface 601 and the interface 602, respectively. Further, after the hardware cryptographic engine completes the operation, the REE and the TEE may directly obtain the operation result through their respective access interfaces. Furthermore, the interface 601 corresponding to the REE and the interface 602 corresponding to the TEE may be isolated from each other. For example, the TEE may not have the capability to access the hardware cryptographic engine via the interface 601. By isolating the hardware interface, the access process of the TEE and the REE and the data information involved can be isolated to reduce data security risks.

Further, in the process that the TEE or the REE needs to perform cryptographic operations, the key used for encryption may be the root key stored in the SE. Therefore, before instructing the hardware cryptographic engine to perform the cryptographic operations, the REE or the TEE may need to request the SE for key information for performing the cryptographic operations. As an example, the SE may derive the key based on the TEE's request to derive the key. In addition, before the derivation, the SE may also verify the access authority of the requester TEE to ensure the security of the root key.

In addition, compared with the SE in FIG. 5, which does not have a direct access interface with the cryptographic engine, the SE in FIG. 6 has a direct access interface 603 with the cryptographic engine. Therefore, in the embodiment shown in FIG. 6, a derived key such as a KDF may be provided to the cryptographic engine via the interface 603 for use in related cryptographic operations of the TEE. Accordingly, the TEE may only need to provide the corresponding data information via the interface 602 and the key information may be provided by the SE. In some embodiments, the SE may also provide the generated derived key to the TEE via shared memory as described above, and cause the TEE to provide key information as well as data information to the cryptographic engine via the interface 602.

In the security architecture system provided by the embodiments of the present disclosure, the access control between the subsystem and the hardware cryptographic engine can be implemented based on a specific access interface. The cryptographic operations can be performed by means of hardware to improve the encryption performance. In addition, the physical isolated based on the access interface prevents the subsystems without the access authority to directly access the cryptographic engine, but needs to request the corresponding services from the subsystems with the access authority. Based on the request, the access authority involved in each access process can be authenticated, such as by signature verification, to fully ensure the security of the data. Therefore, using the security architecture system provided by the embodiments of the present disclosure can effectively improve data security, avoid access operations with security risks, and avoid security risks such as leakage of important information. Further, improving the security of the terminal device is beneficial to enrich the application scenarios of the device. For example, programs with high security requirements can also be installed in personal mobile phones and the corresponding functions can be implemented to ensure user information security and help build a safe and reliable environment for product usage.

Another aspect of the present disclosure provides a cryptographic operation method for a security architecture system. According to the embodiments of the present disclosure, the security architecture system may be the security architecture system described above in conjunction with FIG. 1. For the security architecture system according to some embodiments of the present disclosure, not only device security is ensured based on various security level-related subsystems, but also a hardware cryptographic engine arranged in the security architecture system. In addition, between each subsystem and the hardware cryptographic engine, the cryptographic engine is controlled to perform cryptographic operations based on a dedicated access interface, thereby further improving the security of the device on cryptographic operations and reducing the risk of leakage of important information.

Figure 7:
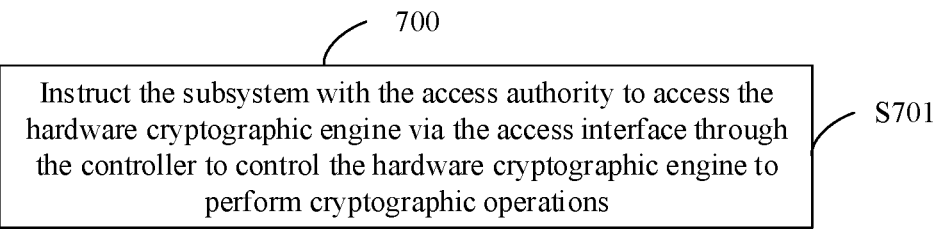
FIG. 7 is a flowchart of a cryptographic operation method according to some embodiments of the present disclosure.

According to some embodiments of the present disclosure, the security architecture system may include one or more subsystems, a hardware cryptographic engine, and a controller, where the one or more subsystems may have access to the hardware cryptographic engine. FIG. 7 is a flowchart of a cryptographic operation method according to some embodiments of the present disclosure. As shown in FIG. 7, a method 700 includes a process 701: instructing the subsystem with the access authority to access the hardware cryptographic engine via the access interface through the controller to control the hardware cryptographic engine to perform cryptographic operations. According to some embodiments of the present disclosure, for the subsystem having the access authority to access the hardware cryptographic engine, the hardware cryptographic engine may be accessed via the access interface via the instruction of the controller, thereby controlling the hardware cryptographic engine to perform the cryptographic operations.

According to some embodiments of the present disclosure, the access authority of each of the subsystems described above to the security architecture system may be controlled based on the access interface. As an example, if the REE does not have the access authority to the hardware cryptographic engine, the REE will not have the access interface to the hardware cryptographic engine, thereby avoiding the risk of information leakage from the hardware cryptographic engine due to an attack on the REE. The present disclosure does not limit the specific implementation for of the subsystems in the security architecture system provided by the embodiments of the present disclosure. For example, in other implementations, the security architecture system may also include one or more of the REE, the TEE, and the SE.

the hardware cryptographic engine according to some embodiments of the present disclosure may be configured to support the required cryptographic operation algorithms. For example, the cryptographic operation algorithms may include symmetric cryptographic algorithms, asymmetric cryptographic algorithms, hash algorithms, etc., where the asymmetric cryptographic algorithms are encryption algorithms that use different keys for encryption and decryption. It should be understood that, the hardware cryptographic engine according to some embodiments of the present disclosure may have one or more of the various encryption algorithms described above, and may also be used to implement other encryption algorithms or function, which are not limited by the embodiments of the present disclosure.

The controller according to some embodiments of the present disclosure may be implemented as a processor such as an SOC. That is, the processor may control a subsystem with the access authority through instructions to instruct the hardware cryptographic engine to perform cryptographic operations via the access interface. Alternatively, the controller may also be implemented inside the security architecture system, which is not limited by the embodiments of the present disclosure. It should be understood that, the controller may realize the instruction to the subsystem in the form of software or hardware, such that the subsystem can perform the relevant actions based on the instruction initiated by the controller. In addition, the instruction operation of the controller to each subsystem may be a direct instruction or an indirect instruction, which is not limited in the embodiments of the present disclosure.

In the security architecture system suitable for the cryptographic operation method according to some embodiments of the present disclosure, the subsystem having the access authority to access the hardware cryptographic engine may have an access interface with the hardware cryptographic engine. Subsequently, the subsystem with the access authority may be instructed via the controller to access the hardware cryptographic engine via the access interface, thereby controlling the hardware cryptographic engine to perform cryptographic operations. By setting the access interface to realize the access control to the hardware cryptographic engine, the system can perform cryptographic operations in hardware more flexibly, and the performance of the cryptographic operations can be improved, thereby meeting the needs of many application scenarios.

It should be noted that the cryptographic operation method provided by the embodiments of the present disclosure may be applied to an application environment with high security requirements, for example, to manage important resources stored in the SE. As an example, applications related to important resources stored in the SE may be traditional smart cards such as bank cards, bus cards, USD shields, etc. The security architecture system implementing the cryptographic operation method described above can provide users with higher security services.

According to some embodiments of the present disclosure, the one or more subsystems may include a first execution environment subsystem and a secure element subsystem. The first execution environment subsystem may not have the access authority to directly access the hardware cryptographic engine. The secure element subsystem may have the access authority to access the electronic device, and access the hardware cryptographic engine via the first access interface. According to some embodiments of the present disclosure, the first execution environment subsystem may include at least one of a REE subsystem and a TEE subsystem.

According to some embodiments of the present disclosure, controlling the hardware cryptographic engine to perform cryptographic operations may include: sending a cryptographic operation request to the secure element subsystem through the first execution environment subsystem in response to an instruction from the controller. The cryptographic operation request may indicate key information and data information for performing the cryptographic operations. Controlling the hardware cryptographic engine to perform cryptographic operations may also include: obtaining the cryptographic operation request from the first execution environment subsystem through the secure element subsystem, and sending the key information and the data information to the hardware cryptographic engine via the first access interface. The hardware cryptographic engine is configured to perform the cryptographic operations on the data information based on the key information.

According to some embodiments of the present disclosure, the cryptographic operation method may further include: obtaining the operation result of the cryptographic operation perform by the hardware cryptographic engine through the first access interface through the secure element subsystem, and storing the operation result in the shared memory. The cryptographic operation method may also include obtaining the operation result of the cryptographic operation perform by the hardware cryptographic engine from the shared memory through the first execution environment subsystem.

Figure 8:
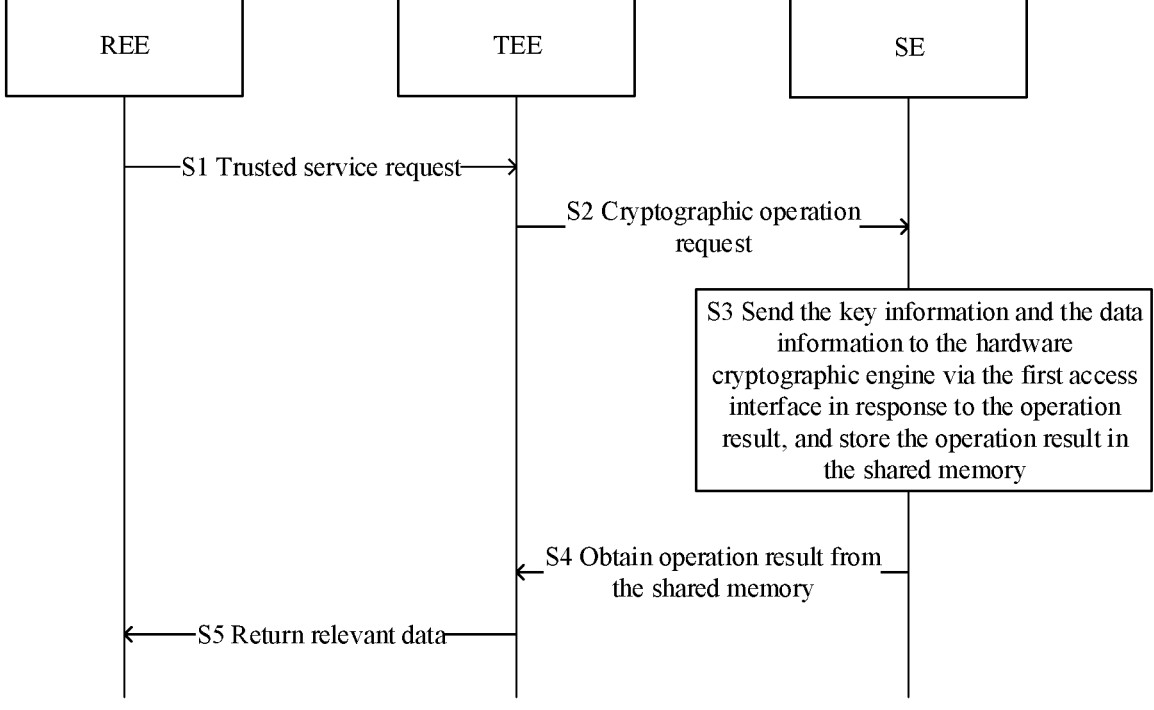
FIG. 8 is an interactive flowchart of the cryptographic operation method according to some embodiments of the present disclosure.

FIG. 8 is an interactive flowchart of the cryptographic operation method according to some embodiments of the present disclosure. In the example shown in FIG. 8, the structure of the security architecture system with respect to the subsystems can be made to FIG. 4, in which only the SE has an access interface to access the hardware cryptographic engine.

Based on the security architecture system shown in FIG. 4, the REE, the TEE, and the SE can cooperate with each other to ensure system security. In addition, since the SE has the highest security compared to the REE and the TEE, important resources such as rook keys are generally stored in the SE.

First, as shown in FIG. 8, for example, in application scenarios involving payment, users may first implement basic services such as browsing products, selecting products, and submitting orders based on the applications in the REE. Next, in the process at S1, the REE may send the trusted service requests to the TEE, such that the business process moves to the TEE, thereby realizing processes such as verifying the payment environment, displaying the payment information, user inputting the payment key or verifying fingerprints, etc. Next, when the TEE needs to perform cryptographic operations on certain data, the TEE may send a cryptographic operation request to the SE (the process at S2) to request the SE to provide the corresponding services, where the cryptographic operation request may indicate the key information and the data information for performing the cryptographic operation. In the process at S3, after obtaining the cryptographic operation request, the SE may send the key information and the data information to the hardware cryptographic engine via the first access interface (e.g., the interface 401 in FIG. 4). In response to the operation result, the SE may obtain the operation result via the access interface, and store the operation result in the shared memory. Subsequently, in the process at S4, the TEE may obtain the operation result through the shared memory, and returns the related data to the REE based on business needs in the process at S5.

In addition, in response to the cryptographic operation request in the process at S2, the SE may determine whether the requesting TEE has the authority to use the corresponding key information. If it is determined that the TEE has the access authority, the TEE may be allowed to access the root key or perform key derivation, thereby instructing the cryptographic engine to perform the corresponding cryptographic operations. In some embodiments, the SE may be used to ensure the security of the resources stored in it through permission verification.

In the above embodiment, the hardware cryptographic engine may only be accessed by the SE, while the REE and the TEE may only request the SE to provide the corresponding cryptographic operation service. Since the SE firmware is relatively small and is generally developed and provided by chip manufacturers, its risk of security vulnerabilities is extremely low compared to the TEE or the REE. Therefore, the security architecture system in the above embodiment can effectively protect the security of resources such as root keys.

According to some embodiments of the present disclosure, the one or more subsystems may include a first execution environment subsystem and a secure element subsystem. The first execution environment subsystem may have the access authority to directly access the hardware cryptographic engine, and access the hardware cryptographic engine via the second access interface. The secure element subsystem may not have the access authority to access the hardware cryptographic engine. In some embodiments, the first execution environment subsystem may include at least one of a REE or a TEE.

According to some embodiments of the present disclosure, controlling the hardware cryptographic engine to perform cryptographic operations may include requesting key information for performing cryptographic operations from the secure element subsystem through the first execution environment subsystem in response to an instruction from the controller, and sending the key information and the data information to the hardware cryptographic engine via the second access interface for the security architecture system to perform cryptographic operations on the data information based on the key information. The method may further include obtaining the operation result of the cryptographic operation performed by the hardware cryptographic engine by the first execution environment subsystem through the second access interface.

According to some embodiments of the present disclosure, the cryptographic operation method may further include, for the key information request for the cryptographic operations, sending the key information to the first execution environment subsystem via the shared memory by the secure element subsystem in response to the first execution environment subsystem having the access authority to use the key information. In some embodiments, the key information may include a derived key generated based on the root key indicated by the request.

In the above embodiment, for the structure of the subsystems of the security architecture system corresponding to the cryptographic operation method, reference can be made to FIG. 5. As the first execution environment subsystem, the REE and the TEE may have the access authority to access the hardware cryptographic engine. The REE may access the hardware cryptographic engine via the access interface 501, and the TEE may access the hardware cryptographic engine via the access interface 502. In addition, the SE may not have the access authority to access the hardware cryptographic engine. For the processes performed by the cryptographic operation method in this embodiment, reference can be made to the above description in conjunction with FIG. 5, which will not be repeated here.

According to some embodiments of the present disclosure, the one or more subsystems may include a first execution environment subsystem and a secure element subsystem. The first execution environment subsystem may have the access authority to access the hardware cryptographic engine, and access the hardware cryptographic engine via the third access interface. The secure element subsystem may have the access authority to access the hardware cryptographic engine, and access the hardware cryptographic engine via the fourth access interface. some embodiments, the first execution environment subsystem may include at least one of a REE or a TEE.

According to some embodiments of the present disclosure, controlling the hardware cryptographic engine to perform cryptographic operations may include: requesting key information for performing cryptographic operations from the secure element subsystem through the first execution environment subsystem in response to an instruction from the controller, and sending the data information to the hardware cryptographic engine via the third access interface for the hardware cryptographic engine to perform cryptographic operations on the data information based on the key information.

According to some embodiments of the present disclosure, the cryptographic operation method may further include, for the key information request for the cryptographic operations, sending the key information to the hardware cryptographic engine via the fourth access interface by the secure element subsystem in response to the first execution environment subsystem having the access authority to use the key information for the hardware cryptographic engine to perform cryptographic operations on the data information based on the key information; and obtaining the operation result of the cryptographic operation performed by the hardware cryptographic engine through the third access interface by the first execution environment subsystem. In some embodiments, the key information may include a derived key generated based on the root key indicated by the request.

In the above embodiment, for the structure of the subsystems of the security architecture system corresponding to the cryptographic operation method, reference can be made to FIG. 6. As the first execution environment subsystem, the REE and the TEE may have the access authority to access the hardware cryptographic engine. The REE may access the hardware cryptographic engine via the access interface 601, and the TEE may access the hardware cryptographic engine via the access interface 602. In addition, the SE may also have the access authority to access the hardware cryptographic engine, and access the hardware cryptographic engine via the access interface 603. For the processes performed by the cryptographic operation method in this embodiment, reference can be made to the above description in conjunction with FIG. 6, which will not be repeated here.

Figure 9:
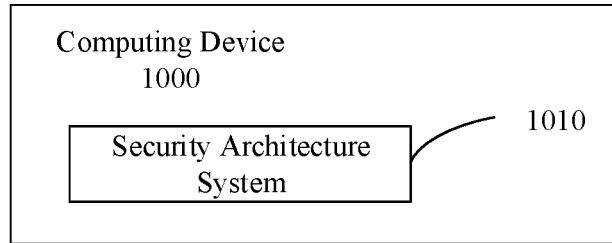
FIG. 9 is a schematic block diagram of a computing device according to some embodiments of the present disclosure.

Another aspect of the present disclosure further provides a computing device. FIG. 9 is a schematic block diagram of a computing device according to some embodiments of the present disclosure. Specifically, a computing device 1000 according to some embodiments of the present disclosure may be configured with a security architecture system 1010 as described above. The security architecture system may include one or more subsystems, a hardware cryptographic engine, and a controller. In some embodiments, the access control between the subsystems and the hardware cryptographic engine may be implemented based on a specific access interface. For the specific form and the implemented functions of the security architecture system arranged in the computing device, reference can be made to the above description, which will not be repeated here.

By using the computing device including the security architecture system provided by the embodiments of the present disclosure, the data security can be effectively improved, the access operations with security risks can be avoided, and security risks such as leakage of important information can be avoided. Further, improving the security of the computing device is beneficial to enrich the application scenarios of the device. For example, programs with high security requirements can also be installed in personal mobile phones and the corresponding functions can be implemented to ensure user information security and help build a safe and reliable environment for product usage.

Figure 10:
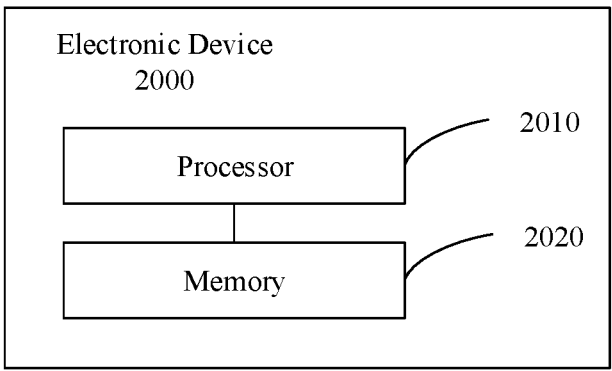
FIG. 10 is a schematic block diagram of an electronic device according to some embodiments of the present disclosure.

In addition, FIG. 10 is a schematic block diagram of an electronic device according to some embodiments of the present disclosure. As shown in FIG. 10, an electronic device 2000 may be configured with a processor 2010 and a memory 2020. Computer readable codes may be stored in the memory 2020. The computer readable codes, when executed by the processor 2010, may cause the processor to implement the cryptographic operation method according to some embodiments of the present disclosure. Alternatively, the processor 2010 may also implement some or all of the functions implemented by the controller described above. For example, the processor may instruct the TEE or the REE to start the corresponding cryptographic operation process. Specifically, the electronic device 2000 may be arranged with a security architecture system as shown in one of FIG. 4 to FIG. 6, and the cryptographic operation method according to some embodiments of the present disclosure may be implemented through the security architecture system described above.

The processor 2010 may perform various actions and processes according to a program stored in the memory 2020. Specifically, the processor 2010 may be an integrated circuit chip with signal processing capabilities. The processor may be a general-purpose processor, a digital signal processor (DSP), an application specific integrated circuit (ASIC), a ready-made programmable gate array (FPGA) or other programmable logic devices, a discrete gate or a transistor logic device, and a discrete hardware component. The general-purpose processor may be a microprocessor, or the processor may also be any conventional processor, etc., and can be X86 architecture or ARM architecture, etc. The processor 2010 may be configured to implement or execute various methods, steps and logic block diagrams disclosed in the embodiments of the present disclosure.

Memory 2020 can store computer executable instruction codes which are used to implement the cryptographic operation method according to the embodiments of the present disclosure when executed by the processor 2010. The memory 2020 may be a volatile memory or a nonvolatile memory or may include both volatile memory and nonvolatile memory. Nonvolatile memory may be read-only memory (ROM), programmable read-only memory (PROM), erasable programmable read-only memory (EPROM), electrically erasable programmable read-only memory (EEPROM), or flash memory. The volatile memory may be a random-access memory (RAM), which is used as an external cache. Many forms of RAMs are available, such as static random-access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronously connected dynamic random access memory (SLDRAM) and direct memory bus random access memory (DR RAM). It should be noted that the memory of the method described herein is intended to include, but not be limited to, these and any other suitable types of memories.

Figure 11:
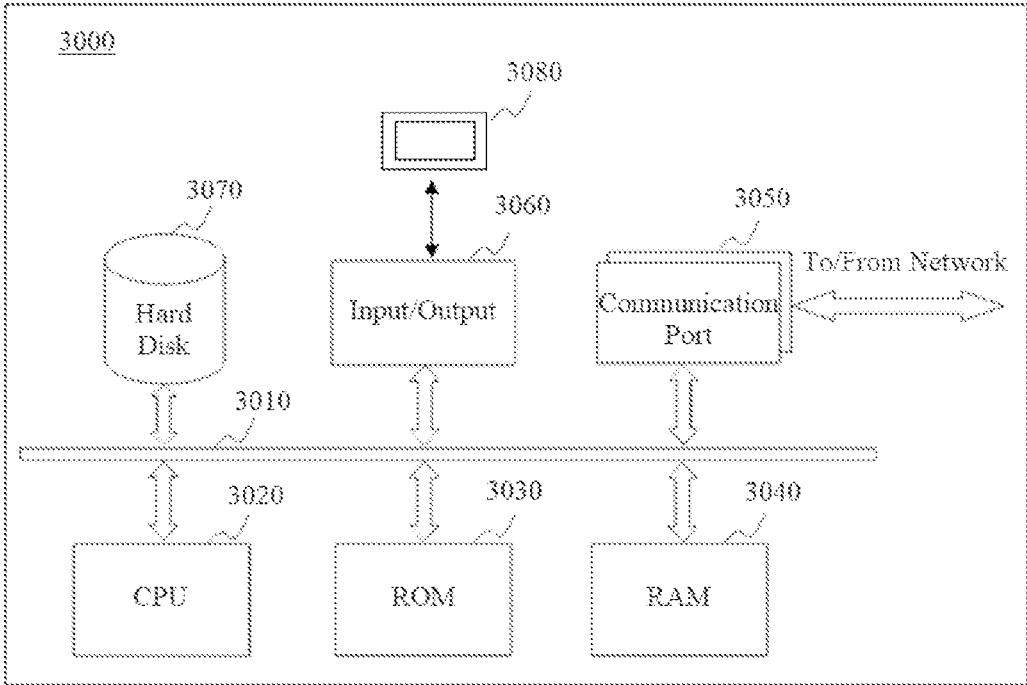
FIG. 11 is a schematic diagram of an electronic device architecture according to some embodiments of the present disclosure.

The method or device according to the embodiments of the present disclosure may also be implemented by means of the architecture of a computing device 3000 shown in FIG. 11. As shown in FIG. 11, the computing device 3000 may include bus 3010, one or more CPUs 3020, read-only memory (ROM) 3030, random access memory (RAM) 3040, communication port 3050 connected to the network, input/output component 3060, hard disk 3070, etc. The storage device in the computing device 3000, such as ROM 3030 or hard disk 3070, may store various data or files used for processing and/or communication of the cryptographic operation method provided by the present disclosure, as well as program instructions executed by the CPU. The computing device 3000 may also include a user interface 3080.

It is apparent that the architecture shown in FIG. 11 is only exemplary, when implementing different devices, one or more components of the computing device shown in FIG. 11 may be omitted according to the specific requirements. As an example, the computing device 3000 described above may be implemented as a mobile terminal installed with an application program, and the security architecture system according to the embodiments of the present disclosure may be implemented in the mobile terminal to realize the corresponding functions.

In the security architecture system, the cryptographic operation method of the security architecture system, and the computing device provided by some embodiments of the present disclosure, the subsystems in the security architecture system with the access authority to access the hardware cryptographic engine can realize cryptographic operations, improve the performance of cryptographic operations, and ensure the security of key information, data information, and operation results involved in the process of cryptographic operations through the access interfaces. Accordingly, cryptographic operations in all stages can have higher security level, thereby avoiding security risks such as leakage of important information.

Those skilled in the art can understand that the content disclosed in the present disclosure can have various modifications and improvements. For example, the various devices or components described above can be implemented by hardware, or can be implemented by software, firmware, or a combination of some or all of them.

Furthermore, although the present disclosure makes various references to certain units in the system according to the embodiments of the present disclosure, any number of different units can be used and run on the client and/or server. The unit is merely illustrative and different units can be used for different aspects of the system and method.

Flowcharts are used in the present disclosure to illustrate the steps of methods provided by the embodiments of the present disclosure. It is to be expressly understood that, the preceding or following steps may or may not be implemented in exact order. Conversely, the steps may be performed in inverted order, or simultaneously. In addition, one or more other steps may be added to the flowcharts.

Those of ordinary skill in the art can understand that all or part of the steps in the above method can be completed by instructing relevant hardware through a program, and the program can be stored in a computer-readable storage medium, such as a read-only memory, a magnetic disk, or an optical disk, etc. Optionally, all or part of the steps of the foregoing embodiments can also be implemented using one or more integrated circuits. Accordingly, each module/unit in the foregoing embodiments can be implemented in the form of hardware or can be implemented in the form of software functional modules. The present disclosure is not limited to the combination of hardware and software in any particular form.

Unless defined otherwise, all terms (including technical and scientific terms) used here have the same meaning as those commonly understood by those of ordinary skill in the art to which this disclosure belongs. It should also be understood that terms such as those defined in ordinary dictionaries should be interpreted as having meanings which are consistent with their meanings in the context of the relevant technology and should not be interpreted in ideal or extremely formal meanings, unless explicitly defined as such here.

The above is an illustration of the present disclosure and should not be considered as a limitation thereof. Although several exemplary embodiments of the present disclosure are described, it will be easy for those skilled in the art to understand that many modifications can be made to the exemplary embodiments without departing from the novel teaching and advantages of the present disclosure. Therefore, all these modifications are intended to be included in the scope of the present disclosure as defined in the claims. It should be understood that the above is an illustration of the present disclosure and should not be considered as being limited to the particular embodiments disclosed, and modifications to the disclosed embodiments and other embodiments are intended to be included in the scope of the appended claims. The present disclosure is limited by the claims and their equivalents.

What is claimed is:

1. A security architecture system comprising:
a rich execution environment subsystem (REE);
a trusted execution environment subsystem (TEE);
a secure element subsystem (SE);
a hardware cryptographic engine, wherein the SE has access authority to the hardware cryptographic engine via a first dedicated hardware access interface that physically connects the SE and the hardware cryptographic engine, wherein the REE or the TEE subsystem has access authority to the hardware cryptographic engine via a second dedicated hardware access interface, and wherein a root key is stored in the SE and the root key is used to generate a key, the REE, TEE and SE being on one device; and
a controller configured to instruct the SE to control the hardware cryptographic engine to perform a cryptographic operation based on the key.

2. The security architecture system of claim 1, wherein:
one of the REE or the TEE is configured to send a cryptographic operation request to the SE in response to a first instruction from the controller, the cryptographic operation request indicating key information and data information for performing the cryptographic operation; and
the SE is configured to obtain the cryptographic operation request from the one of the REE or the TEE, and send the key information and the data information to the hardware cryptographic engine via the first dedicated hardware access interface, and the hardware cryptographic engine is configured to perform the cryptographic operation on the data information based on the key information.

3. The security architecture system of claim 2, further comprising:
a memory, wherein:
the SE is further configured to: obtain an operation result of the cryptographic operation performed by the hardware cryptographic engine via the first dedicated hardware access interface, and store the operation result in the memory; and
the one of the REE or the TEE is further configured to: obtain the operation result of the cryptographic operation performed by the hardware cryptographic engine through the second dedicated hardware access interface.

4. A cryptographic operation method for a security architecture system including a rich execution environment subsystem (REE), a trusted execution environment subsystem (TEE), and a secure element subsystem (SE), the method comprising:
instructing, by a controller, the SE having exclusive access authority to a hardware cryptographic engine via a first dedicated hardware access interface that physically connects the secure element subsystem and the hardware cryptographic engine, wherein neither of the REE or the TEE has access authority to the hardware cryptographic engine via a second dedicated hardware access interface, and wherein a root key is stored in the SE and the root key is used to generate a key the REE, TEE and SE being on one device; and
controlling, at the SE and in response to the instruction from the controller, the hardware cryptographic engine to perform a cryptographic operation based on the key.

5. The method of claim 4, wherein:
controlling the hardware cryptographic engine to perform the cryptographic operation includes:
sending, by one of the REE or the TEE, a cryptographic operation request to the SE in response to a first instruction of the controller, the cryptographic operation request indicating key information and data information for performing the cryptographic operation;
obtaining, by the SE, the cryptographic operation request from the one of the REE or the TEE, and sending the key information and the data information to the hardware cryptographic engine via the first hardware access interface; and
performing, by the hardware cryptographic engine, the cryptographic operation on the data information based on the key information.

6. The method of claim 5, further comprising:
obtaining, by the SE, an operation result of the cryptographic operation performed by the hardware cryptographic engine via the first dedicated hardware access interface, and storing the operation result in a memory; and
obtaining, by the one of the REE or the TEE, the operation result of the cryptographic operation performed by the hardware cryptographic engine through the second dedicated hardware access interface.

7. A computer device including a security architecture system, the security architecture system comprising:
a rich execution environment subsystem (REE);
a trusted execution environment subsystem TEE);

a secure element subsystem (SE);

a hardware cryptographic engine, wherein the SE has exclusive access authority to the hardware cryptographic engine via a first dedicated hardware access interface that physically connects the SE and the hardware cryptographic engine, wherein neither of the REE or the TEE has access authority to the hardware cryptographic engine via a second dedicated hardware access interface, and wherein a root key is stored in the SE and the root key is used to generate a key; and a controller configured to instruct the SE to control the hardware cryptographic engine to perform a cryptographic operation based on the key.

8. The computer device of claim 7, wherein:

one of the REE or the TEE is configured to send a cryptographic operation request to the SE in response to a first instruction from the controller, the cryptographic operation request indicating key information and data information for performing the cryptographic operation; and the SE is configured to obtain the cryptographic operation request from the one of the REE or the TEE, and send the key information and the data information to the hardware cryptographic engine via the first dedicated hardware access interface, and the hardware cryptographic engine is configured to perform the cryptographic operation on the data information based on the key information.

9. The computer device of claim 8, further comprising:

a memory, wherein:

the SE is further configured to: obtain an operation result of the cryptographic operation performed by the hardware cryptographic engine via the first dedicated hardware access interface, and store the operation result in the memory; and the one of the REE or the TEE is further configured to: obtain the operation result of the cryptographic operation performed by the hardware cryptographic engine through the second dedicated hardware access interface.

10. The security architecture system of claim 2, wherein:

the TEE is configured to send the cryptographic operation request to the SE secure element subsystem;

the SE is configured to obtain the cryptographic operation request from the TEE; and the SE is further configured to, prior to sending the key information to the hardware cryptographic engine, verify whether the TEE has authority to use a key associated with the key information, and the key information is sent to the hardware cryptographic engine in response to a successful verification that the TEE has authority to use the key associated with the key information.

11. The security architecture system of claim 2, wherein:

the cryptographic operation request includes one or more parameters for key derivation; and the SE is further configured to perform a key derivation process based on the one or more parameters for key derivation to generate a derived key, and send the generated derived key to the hardware cryptographic engine via the first dedicated hardware access interface.

\* \* \* \* \*